United States Patent

[11] 3,631,398

[72] Inventor Larry R. Houghton
St. Joseph, Mich.
[21] Appl. No. 79,866
[22] Filed Oct. 12, 1970
[45] Patented Dec. 28, 1971
[73] Assignee Whirlpool Corporation

[54] TV REMOTE CONTROL SYSTEM
24 Claims, 5 Drawing Figs.

[52] U.S. Cl. .................................................... 340/167 R, 340/168 R, 340/348
[51] Int. Cl. .................................................... H04g 9/00
[50] Field of Search ........................................ 340/167, 164, 148, 168, 348

[56] References Cited

UNITED STATES PATENTS

| | | | |
|---|---|---|---|
| 3,309,670 | 3/1967 | Dick et al. .................... | 340/164 |
| 3,335,404 | 8/1967 | Wood........................... | 340/164 |
| 3,423,733 | 1/1969 | Auer, Jr. et al. .............. | 340/168 |

*Primary Examiner*—Donald J. Yusko
*Attorneys*—James S. Nettleton, Thomas E. Turcotte, Burton H. Baker, Gene Heth, Franklin C. Harter, Anthony Niewyk, Robert L. Judd and Hofgren, Wegner, Allen, Stellman & McCord

ABSTRACT: A remote control transmitter for controlling a television receiver generating a composite signal of single-frequency pulses including a selected binary code combination of information bits, a synchronization pulse prior to each information bit, and an elongated execute pulse at the end of the last information bit. A remote control receiver locally generates clock pulses corresponding to the received synchronization pulses to enable a storage device to serially store the received information bits. The stored information is decoded during storage and, upon reception of the execute pulse, a single output is provided corresponding to the selected function.

INVENTOR
LARRY R. HOUGHTON

BY Hofgren, Wegner, Allen, Stellman & McCord
ATTORNEYS.

TV REMOTE CONTROL SYSTEM

BACKGROUND OF THE INVENTION

1. Field of the Invention

This invention relates to remote control systems and in particular to remote control transmitters and receivers such as for controlling television receivers.

2. Description of the Prior Art

In one known remote control system, a transmitter generates supersonic signals of different frequencies. Each function to be controlled by the remote control receiver is assigned a particular channel or narrow frequency range, wherein only a signal corresponding to that frequency range can cause a given function to be performed. Present supersonic transducers are limited in their bandwidth, and thus only a limited number of control functions are possible. This limited bandwidth makes it difficult to control the additional functions required by televisions with UHF tuners and color adjustments.

In another known prior art control system, a combination of tones is simultaneously transmitted, with each different tone combination corresponding to a different function to be performed. In such a system, if a large number of separate command signals are to be generated and detected, the necessary frequency responsive elements become very cumbersome, many in number, and require tedious tuning and adjustment.

In still another known control system, a transmitter generates a command signal comprising a plural number of single-frequency pulses. Each pulse corresponds to a different function and the pulse corresponding to the selected control function is pulse width modulated. Such a control system requires an excessive long train of pulses where a large number of functions are to be controlled.

SUMMARY OF THE INVENTION

The improved television remote control system of the present invention overcomes the disadvantages of the prior systems noted above in a novel and simple manner. In the present cited system, a remote control transmitter generates a composite signal of single-frequency pulses containing a selected binary code combination. The particular code combination indicates television command functions manually selected by a viewer. A synchronization pulse is automatically generated prior to each information bit of the code combination and an elongated execute pulse is automatically generated at the end of the last code combination bit. A remote control receiver locally generates clock pulses corresponding to the received synchronization pulses, generates a read pulse corresponding to the received execute pulse, and produces a composite digital signal corresponding to the transmitted composite signal. The produced composite signal is serially presented to a storage device, but the locally generated clock pulses enable storage only when the code combination bits are presented thereby precluding storage of synchronization pulses and enhancing noise immunity. The stored code combination is decoded for producing an output to enable a switching device corresponding to the selected function. The enabled switching device controls the associated function in response to the read pulse.

Thus, the invention comprehends the provision of an improved television remote control system using a single-frequency channel to control a plurality of functions.

The control system uses a single-frequency channel in which an improved remote control transmitter generates a binary code combination of pulses unique to a selected function and a remote control receiver temporarily stores and decodes said code combination to control the selected function.

The control system includes an improved remote control transmitter which generates a composite signal of single-frequency pulses containing a binary code combination, a synchronization pulse prior to each bit of the code combination, and an elongated execute pulse after the last bit of the code combination, and an improved remote control receiver locally generates clock pulses corresponding to received synchronization pulses to preclude storage except when binary code combination bits are received, decodes the stored code combination, and controls the corresponding function in response to a locally generated read pulse corresponding to the elongated execute pulse.

BRIEF DESCRIPTION OF THE DRAWINGS

Further features and advantages of the invention will be apparent from the following descriptions taken in connection with the accompanying drawings wherein.

DESCRIPTION OF THE PREFERRED EMBODIMENT

Figure 1:
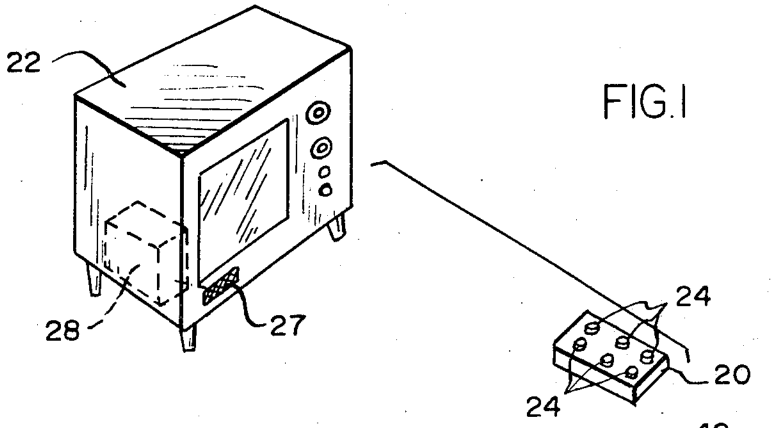
FIG. 1 is a perspective view of a remote control transmitter controlling a conventional television receiver having a remote control transmitter embodying the invention.

In the exemplary embodiment of the invention as shown in the drawings, a remote control system includes a self-contained remote control transmitter 20, which may be hand held, allowing a viewer to select a number of command functions to control a conventional television receiver 22. The command functions are controlled by individual switches of transmitter 20 manually actuable by means of pushbuttons 24 extending through the housing of transmitter 20. In order to control television receiver 22, the viewer aims transmitter 20 at the receiver and actuates a selected one of the pushbuttons 24, generating a composite signal to a pickup transducer 27 located at the television receiver 22. The output of transducer 27 is coupled to a remote control receiver 28 which decodes a command signal component of the composite signal and produces a corresponding output which directly controls the television receiver 22. Functions which may be so controlled illustratively include volume control, television power on-off selection, channel selection, color tuning, etc.

Figure 2:
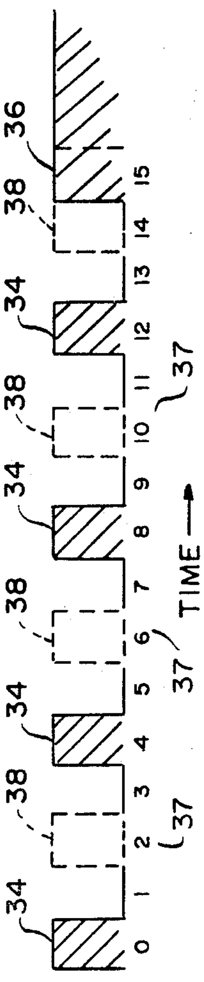
FIG. 2 is a waveform diagram illustrating the time relationship of the various components of a composite signal produced by the transmitter.

The composite signal transmitted by remote control transmitter 20 and reproduced by remote control receiver 28 contains two separate types of information: (a) decoding pulses comprising synchronization pulses and an execute pulse, and (b) a binary code combination that indicates the given function to be performed. FIG. 2 illustrates the time relationship of these signals. Although the illustrative signal of FIG. 2 comprises 16 equal time periods, or its (numbered 0 through 15) followed by a continuous signal, it will be understood by those skilled in the art that the number of bits in the composite signal is primarily determined by the number of functions that require control. Expanding the signal to include a greater number of bits would enable control of a greater number of functions.

The shaded pulses shown in FIG. 2 represent decoding pulses 34 which are generated in response to actuation of any one of pushbuttons 24. The decoding pulses comprise synchronization pulses 34, shown in decoding bits "0," "4," "8," and "12," and an elongated execute pulse 36 starting in decoding bit "15." A synchronization pulse is generated prior to each information bit and indicates to remote control receiver 28 that a new information bit is to be presented. Execute pulse 36 is generated at the completion of the last information bit and indicates to remote control receiver that all the information has been received and control in accordance with that information may commence. The command signal information is contained in the information bits, bits "2," "6," "10, " and "14." different binary code combination of selected and unselected information bits is provided by actuation of each of pushbuttons 24. This binary code combination is indicated to remote control receiver 28 by generating a command pulse 38 during each of the selected information bits, but not generating a command pulse during any of the unselected information bits.

Each function is uniquely described by the binary code combination of selected and unselected information bits. For example, a binary code combination for turning power on at the receiver might be indicated by not generating any command pulses 38 during any of the information bits. A command signal for turning the volume up might be indicated by generating command pulses 38 during information bits "2" and "6," but not during information bits "10" and "14." The total number of unique combinations possible is 2 raised to the Nth power, where N is the total number of information bits. For a composite signal containing four information bits, as shown in FIG. 2, 16 unique code combinations could be generated. One of the more important advantages of using the binary coding approach is that in order to double the number of unique code combinations capable of being generated, only one more information bit need be added.

Figure 3:
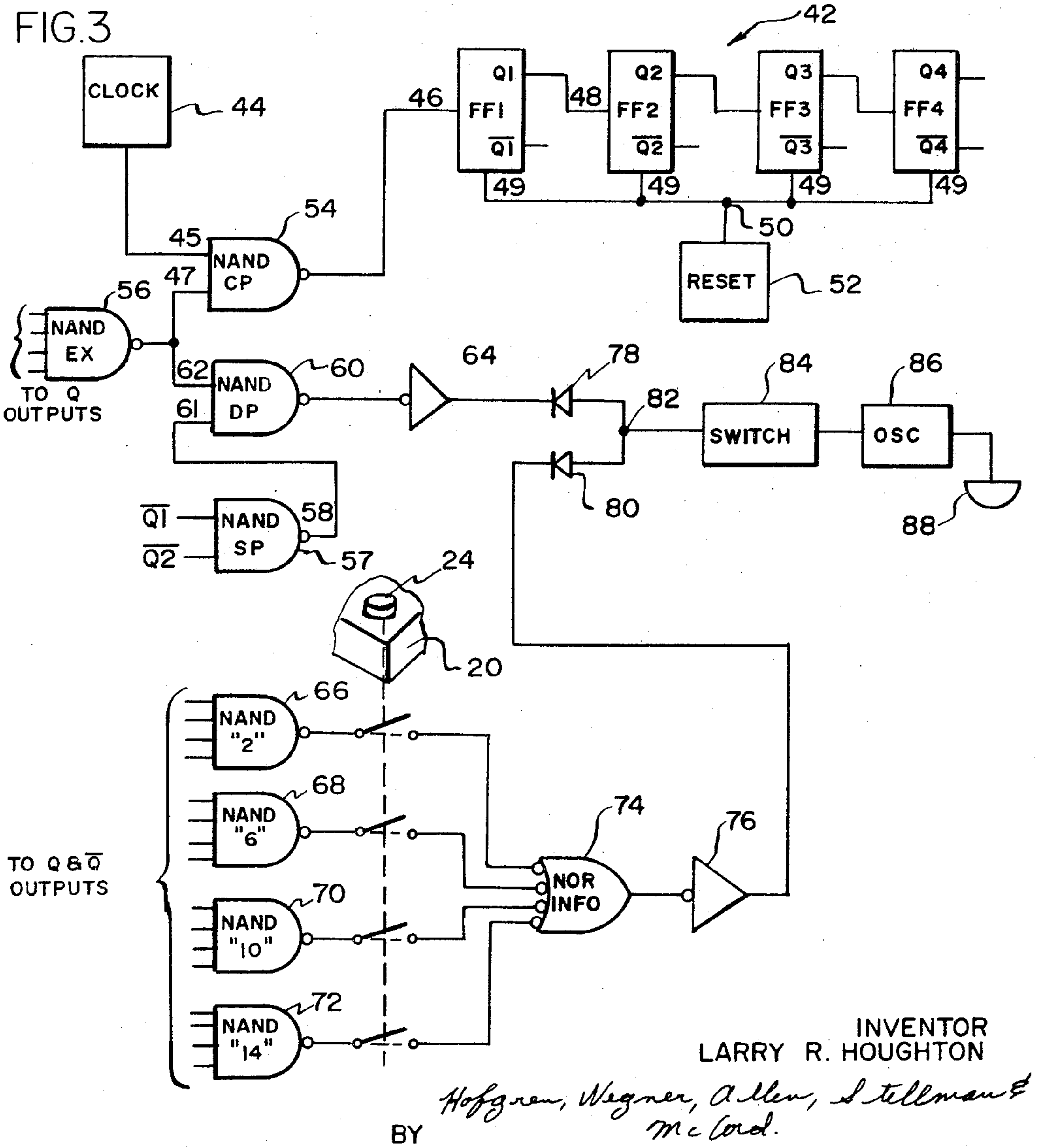
FIG. 3 is a schematic logic diagram of the remote control transmitter circuit.

The purpose of the remote control receiver is to offer a means of selecting a particular binary code combination, to generate that code, and to assemble and transmit the code, the synchronization pulses and the execute pulse in the proper time relationship as shown in FIG. 2. FIG. 3 is a block logic diagram of a preferred embodiment of a remote control transmitter circuit for performing the above functions. Combining the various components of the composite signal in the proper time sequence is generally effectuated by driving binary coded decimal (BCD) counter 42 at a constant bit rate with clock pulse generator 44 and then generating the various component pulses in response to different preselected counting states of BCD counter 42.

A more specific description of the remote control transmitter circuit and its operation is as follows: BCD counter 42 has four regular outputs, Q1 through Q4, and four respective inverted outputs, $\overline{Q1}$ through $\overline{Q4}$, with each pair of outputs associated with a different stage of the cascade of bistable multivibrators FF1 through FF4. Clock pulses applied to input 46 of FF1 are divided by 2, i.e., for every two clock pulses applied to the input, only one clock pulse is generated at the output. The Q output of FF1 supplies clock pulses to input 48 of FF2 which divides these pulses, and so on down the cascade. Since each flip-flop Q output can be in one of two different states (1 state, or high-voltage state, and a 0 state, or low voltage state) and there are four flip-flops, there exist $2^4$, or 16 possible flip-flop output combinations. This gives use to the 16-bit (0 through 15) time base shown in FIG. 2. If more combinations were desired, all that would be needed would be the addition of another flip-flop to give $2^5$, or 32, possible output combinations.

Each of the flip-flops reset inputs are tied together at junction 50. When power is first applied to the transmitter by actuation of any of pushbuttons 24, reset circuit 52 applies a reset pulse to junction 50 which causes all flip-flops to assume the 0 state (i.e., each of the Q outputs goes into the 0 state). This reset pulse insures that BCD counter 42 is at a known starting point for counting clock pulses. It should be noted, however, that any other known starting point could work equally as well.

Clock 44, which may be a free-running multivibrator, a unijunction oscillator, or any other suitable oscillator circuit, produces a train of pulses at a uniform bit rate which are applied to input 45 of NAND CP (clock pulse) gate 54. The other input of NAND CP-gate 54, input 47, is taken from the output of NAND EX (Execute) gate 56 which is in the 1 state except from bit "15" and on, which will be explained in more detail hereinafter. Since the output of NAND EX-gate 56 is in the 1 state, the pulse train appearing at the output of NAND CP-gate 54 will be the inverse of the pulse train generated by clock 44 (since a NAND-gate output goes into the 0 state if, and only if, all inputs are in the 1 state). The output of NAND CP-gate 54 is applied to input 46 thereby driving BCD counter 42 in a standard binary fashion.

Synchronization pulses 34 are required during decoding its 0, 4, 8, and 12 as shown in FIG. 2. NAND SP (Synchronization Pulse) gate 57 is provided for this purpose. Inputs to NAND SP-gate 57 are taken from BCD counter output $\overline{Q1}$ and $\overline{Q2}$. During decoding bits 0, 4, 8, and 12, and only during these bits, $\overline{Q1}$ and $\overline{Q2}$ are both in the 1 state; thus, during, and only during, these bits, does output 58 of NAND SP-gate 57 assume the 0 state. Output 58 is coupled to input 61 of NAND DP (Decoding Pulse) gate 60. NAND DP-gate 60 has input 62 held high by NAND EX-gate 56, as previously explained, and thus NAND DP-gate 60 inverts the synchronization pulses generated by NAND SP-gate 57 applied to input 61. The once inverted synchronization pulses from NAND DP-gate 60 are again inverted by inverter gate 64. The pulse train at the output of inverter gate 64 thus appears with bits "0," "4," "8," and "12" in the 0 state, and all other bits in the 1 state.

Pulses are required during the information bits. Four NAND gates, NAND "2" gate 66, NAND "6" gate 68, NAND "10" gate 70, and NAND "14" gate 72, perform this function by respectively decoding the binary coded decimal equivalents of bit counts 2, 6, 10, and 14 of BCD Counter 42. Each of the gates has four inputs which must all be in the 1 state to produce a 0 state output. The appropriate Q and $\overline{Q}$ outputs of BCD counter 42 are connected to the inputs of each of decoding gates 66, 68, 70, and 72 for decoding the information bit number corresponding to that gate to produce an information pulse during that bit. For instance, in order to produce an information pulse during information bit "2," the inputs of NAND "2" gate 66 would be coupled to $\overline{Q1}$, Q2, $\overline{Q3}$, and $\overline{Q4}$. Only during bit "2" are these four inputs all high, and thus, only during bit "2" will the output of NAND "2" gate 66 assume the 0 state.

The information pulses from each gate 66, 68, 70, and 72 must be switched to an input of NOR INFO (Information) gate 74 before they will appear as command pulses 38 in the sequence shown in FIG. 2. Mechanical switching is employed in the illustrated embodiment, as shown in FIG. 3. However, it will be recognized that electrical switching could be employed instead of the illustrated mechanical system, if desired. The illustrated mechanical switching is effectuated by viewer actuation of a selected one of pushbuttons 24 and indicated in the one representative switching system illustrated in FIG. 3. For instance, if a particular binary code combination is to comprise a command pulse in information bits "2," "10," and "14," but not in information bit "6," switch contacts labeled SW2, SW10, and SW14 would be closed and SW6 kept open upon depression of the selected single pushbutton corresponding to that selected code combination. Subsequently, during bits "2," "10," and "14," a respective input to NOR INFO-gate 74 would go to the 0 state causing the output of NOR INFO-gate 74 to go the 1 state. The command pulses 38 from gate 74 are coupled to the input of inverter gate 76 which inverts the positive command pulses to negative command pulses. The pulse train appearing at the output of inverter gate 76 thus appears with bits "2," "10," and "14" in the 0 state and all other bits in the 1 state.

Diodes 78 and 80 form a discrete AND gate for combining the two pulse trains from inverter gate 64 and 76. When a 0 state pulse appears at the cathode of either or both diodes, a corresponding 0 state pulse appears at anode junction 82. A 0 state pulse at junction 82 actuates switch 84 which, in turn, causes oscillator 86 to oscillate during that pulse. The output of oscillator 86 drives transducer 88, which generates the composite signal of supersonic or ultrasonic pulses.

When the collective state corresponding to bit "15" is reached in the sequence, no further changes in the counter are desired and elongated execute pulse 36 is to be transmitted. This is accomplished with NAND EX-gate 56. The four inputs of NAND EX-gate 56 are respectively connected to Q1, Q2, Q3, and Q4 of BCD counter 42. During, and only during, bit "15" are these inputs all high which makes the output of NAND EX-gate 56 go low. This 0 state output signal disables NAND CP-gate 54 preventing any subsequent clock pulses from being applied to input 46, thus preserving the all 1 state condition of bit "15" in BCD counter 42. During bit "15" the output of NAND SP-gate 57 applied to input 61 is high. When input 62 from NAND EX-gate 56 goes low on bit "15," the output of NAND DP-gate 60 goes high. This action is the same as when a synchronization pulse 34 is generated, except now the high output of NAND DP-gate 60 is maintained due to the continuous 0 state output of NAND EX-gate 56 and elongated execute pulse 36 is generated. This condition continues until the transmitter is shut off by deactuating the selected pushbutton.

Figure 4:
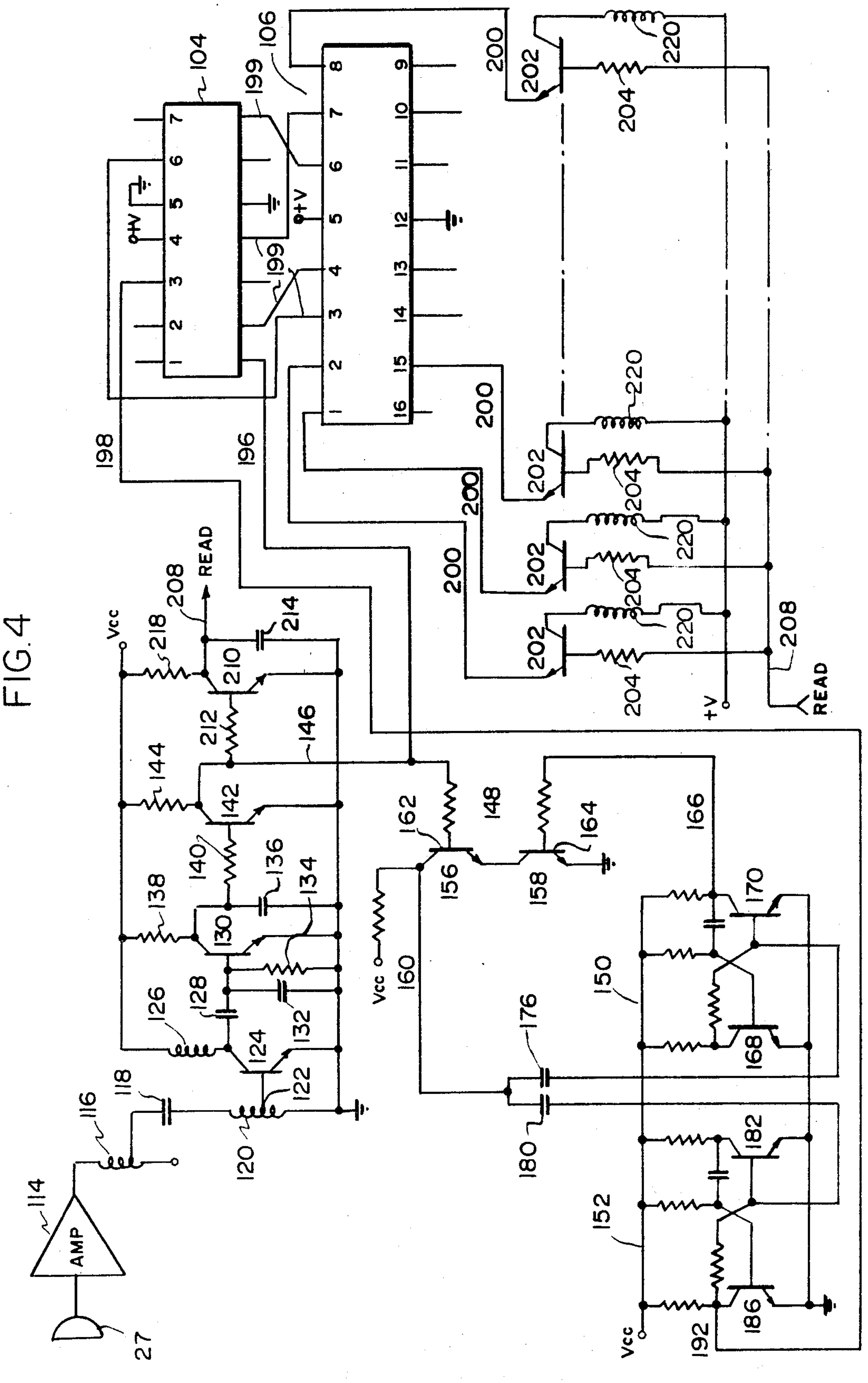
FIG. 4 is a schematic wiring diagram of a remote control receiver circuit.

The function of the remote control receiver is to pick up the transmitted pulse train, amplify and detect the digital waveform, separate the pulses as to their function of decoding or information, decode the binary code combination component, and initiate the desired control function. A preferred embodiment of a remote control receiver circuit is shown in FIG. 4. The remote control receiver comprises an interface circuit for receiving the single-frequency pulses and developing corresponding voltage pulses, a shift register for storing the received binary code combination, a clock pulse generator for enabling storage in the shift register, a decoder for decoding the stored information and enabling one of a plurality of actuators corresponding to the selected function, and a read pulse generator for activating the enable actuator to control the selected function.

Figure 5:
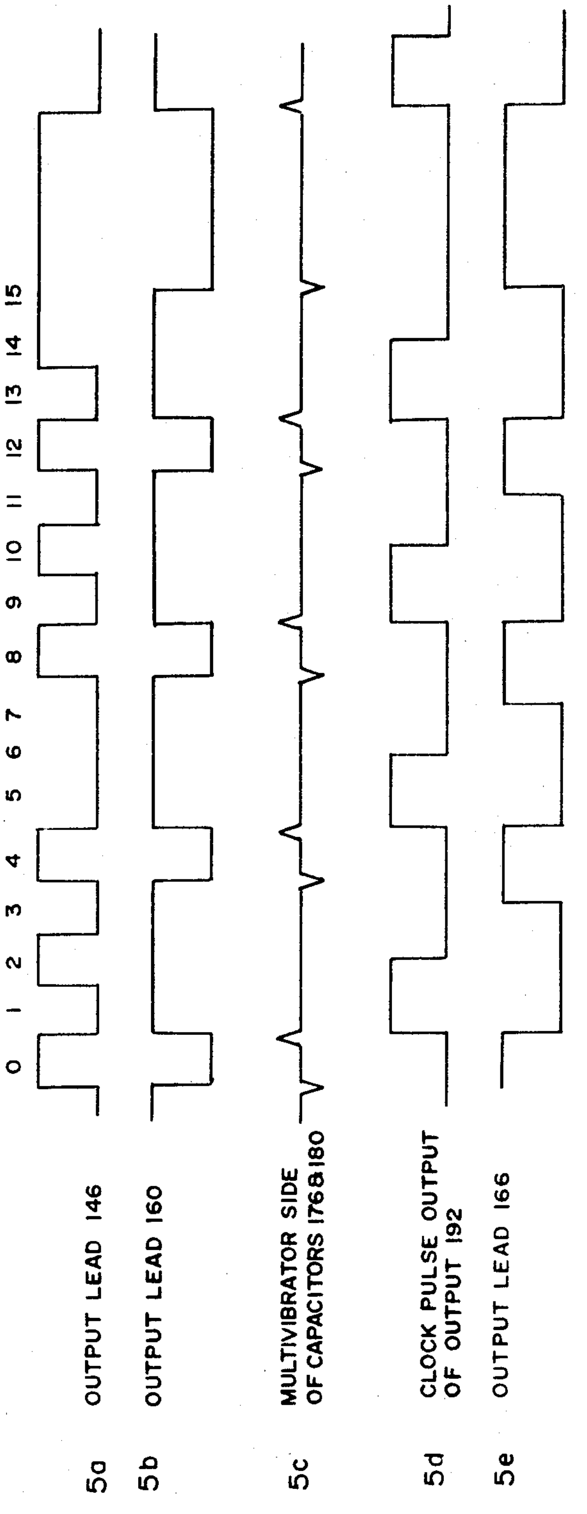
FIG. 5 is a waveform diagram of different waveforms produced in different portions of the remote control receiver circuit of FIG. 4.

A more specific description of the remote control receiver circuit and its operation with reference to the waveforms in FIG. 5 is as follows: The composite signal is pickup up, in the case of an ultrasonic carrier, by microphone 27. An amplifier 114 increases the signal to a level sufficient to drive the circuitry illustrated in FIG. 4. The amplified signal is presented through tapped output transformer 116 to a series-tuned circuit comprising capacitor 118 and inductor 120. A tap 122 on inductor 120 feeds the signal to the base of transistor 124. The amplified waveform which appears across choke 126 is coupled through capacitor 128 to the base of detector amplifier transistor 130. Capacitor 132 filters out noise and transient responses in the waveform and resistor 134 provides a direct current path to ground for the negative half of the signal. Capacitor 136 filters out the carrier signal leaving an amplified inverted digital voltage signal corresponding to the received composite signal across resistor 138 of the desired polarity. This inverted signal is coupled through resistor 140 to the base of transistor 142. Transistor 142 inverts the signal to the desired polarity signal of positive-going voltage pulses which are developed across resistor 144. The received composite signal taken from the collector of transistor 142 is applied to the remaining circuitry through signal output lead 146. A typical signal on output lead 146 might appear as shown in FIG. 5*a* with generated command pulses present in information bits 2, 10, and 14 and no pulse present in information bit "6."

This generated composite signal is applied to the interrelated circuits of FIG. 4 including the clock pulse generator circuit described below. The clock pulse generator circuit comprises discrete NAND-gate 148, monostable multivibrator 150, and monostable multivibrator 152. The function of these elements is to separate the generated synchronization pulses from the command pulses in order to generate a clock pulse for enabling shift register 104.

Transistors 156 and 158 form discrete NAND-gate 148. The base inputs to both of these transistors must be high before output 160 can go low. Base input 162 is coupled to output 146 and base input 164 is coupled to output 166 of monostable multivibrator 150. Monostable multivibrator 150 comprises transistors 168 and 170 coupled in a standard monostable multivibrator fashion with the monostable time period equal to approximately 2½ bits. In its stable state, transistor 170 is off and output 166 of monostable multivibrator 150 is high. Output 160 of NAND-gate 148 is coupled through capacitor 176 to the base of transistor 170. A positive spike applied to the base of transistor 170 turns on transistor 170 and output 166 applied to base 164 of NAND-gate 148 goes low for a period of 2½ bits and then returns to a high level. When the first received synchronization pulse is presented to input 162 of NAND-gate 148, the other input, input 164, is high and the output pulse is inverted as shown in FIG. 5*b*. The signal at the monostable multivibrator side of capacitor 176 appears as spikes shown in FIG. 5*c*. The first positive spike shown in FIG. 5*c* triggers monostable multivibrator 150, causing input 164 of NAND-gate 148 to go low, as shown in FIG. 5*e*. When a command pulse, as shown in bit 2 of FIG. 5*a*, is presented to input 162, input 164 is low, disabling gate 148, and no output transition corresponding to a command pulse can take place. The output of NAND-gate 148 is shown in FIG. 5*b*.

A second monostable multivibrator 152 is coupled through capacitor 180 to the base of transistor 182. Monostable multivibrator 152 is similar to monostable multivibrator 150 except that monostable period is approximately equal to 1½ bits instead of 2½ bits. Output 192 of monostable multivibrator 152 generates clock pulse transitions which are applied to clock pulse input 198 of shift register 104. This clock pulse output is shown in FIG. 5*d*. Whenever a positive spike is presented to the base of transistor 182 of monostable multivibrator 152, output 192 goes high, remains high for 1½ bits, and then makes a negative clock pulse transition during the middle of an information bit.

Information input 196 of shift register 104 is coupled to composite signal output 146, and clock pulse input 198 is coupled to output 192 of monostable multivibrator 152. Shift register 104 shifts in an information bit corresponding to the state of information input 196 when a negative clock pulse transition occurs at clock pulse input 198. Since a negative clock pulse transition is generated by monostable multivibrator 152 only during the middle of information bits, only information bits are shifted in and stored.

Shift register 104 has four outputs 199, each indicating the state of a different stored information bit. Each of the four outputs of the shift register are coupled to the appropriate inputs of BCD/decmial decoder 106. BCD/decimal decoder 106 has a plural number of outputs 200, each of which goes low in response to a different binary-coded decimal stored in shift register 104.

When a decoder output line 200 goes low, it grounds the emitter of a relay driver transistor 202. For that transistor to conduct, however, base drive must be supplied through base resistor 204. All of resistors 204 are coupled to lead 208 which, in turn, is coupled to the collector of transistor 210. The base of transistor 210 is coupled through resistor 212 to output 146 and transistor 210 switches on and off in response to the received digital composite signal. With no signal present, transistor 210 is on and capacitor 214 is discharged. When signal pulses are received, transistor 210 turns off and on accordingly, but the RC time period set by resistor 218 and capacitor 214 is much longer than a bit period, and thus, only a small charge can build up on capacitor 214 during the synchronization pulses or command pulses which is insufficient to turn on any of the driver transistors 202. However, when the generated elongated execute pulse signal is received, transistor 210 stays off for a sufficient length of time for capacitor 214 to charge to a sufficient magnitude to turn on the grounded emitter relay driver transistor 202. Approximately 6 to 10 bit periods are required before sufficient base drive is available on lead 208 for the grounded emitter relay driver transistor to turn on. In the meantime, the entire binary code combination has been entered into shift register 104, decoded and the appropriate emitter corresponding to the selection function grounded. When sufficient base drive is available, grounded emitter transistor can conduct thereby activating its associated relay coil 220. The activate relay control either a potentiometer motor, or another relay corresponding to the function selected.

While I have described one embodiment of the invention, it is obvious that it is capable of many modifications within the inventive scope thereof. The embodiments of the invention in which exclusive property or privilege is claimed are defined as follows.

I claim:

1. A remote control transmitter for transmitting a digital signal for selectively controlling a plurality of remote devices, comprising:

first and second actuatable selection switches;

means for seriatim providing an ordered sequence of bits with at least one bit corresponding to an information bit and at least one bit corresponding to a decoding bit;

means responsive to actuation of either of said switches or generating a decoding pulse during the provision of said decoding bits;

means responsive to actuation of said first selection switch or providing a first binary code combination of selected and unselected information bits to generate a command pulse during each selected information bit of said first binary code combination, and responsive to actuation of said second selection switch for providing a second binary code combination of selected and unselected information bits different from said first binary code combination to generate a command pulse during each selected information bit of said second binary code combination;

means for combining said generated decoding pulses with said generated command pulses into a composite digital signal; and means for transmitting a pulse train of single-frequency pulses corresponding to said composite signal.

2. The remote control transmitter of claim 1 wherein here are a plural number of decoding bits, said decoding bits including a syncronization bit occurring prior to each of said information bits, and said decoding pulse generating means generates a synchronization pulse during each of said synchronization bits.

3. The remote control transmitter of claim 2 wherein there are a plural number of decoding bits, said decoding bits including an execute bit occurring after the last of said information bits, and said decoding pulse generating means generates an elongated execute pulse during and continuing after said execute bit.

4. The remote control transmitter of claim 1 wherein said decoding bit comprises an execute bit occurring after the last of said information bits, and said decoding pulse generating means generates an elongated execute pulse throughout and after said execute bit.

5. The remote control transmitter of claim 1 wherein said timing means comprises means for generating a periodic train of clock pulses, a binary counter with a plural number of flip-flop stages, and means coupling said clock pulse generating means to a toggle input of said binary counter, said flip-flop stages hanging states in response to clock pulses at said toggle input in a standard binary counter fashion, each of said flip-flop stages having outputs for indicating their respective states.

6. The remote control transmitter of claim 5 wherein said command pulse generating means comprises a plurality of logic gates coupled to aid flip-flop output stages with each gate generating an information pulse during a different one of said information bits, a command pulse logic gate for generating a command pulse in response to an information pulse applied to any one of a plurality of inputs of said command gate, and a switching means associated with each of said information pulse generating gates for respectively coupling the information pulse from each of said information pulse generating gates to one of said command pulse gate inputs only when said switching means is in a first of two states, first and second combinations of said switching means respectively corresponding to said first and second binary code combinations assuming said first state respectively in response to actuation of said first and second actuation switches, only those switching means associated with the information pulse generating gates associated with said selected information bits assuming said first state.

7. The remote control transmitter of claim 6 wherein each of said flip-flop stages has a normal output and an inverted output, and said decoding pulse generator includes at least one decoding pulse logic gate with a plurality of inputs respectively coupled to one of said outputs of each of said flip-flop stages, said decoding pulse logic gate generating a decoding pulse in response to all of said decoding gate inputs being in the same state, all of said inputs being in the same state only during said decoding bits.

8. The remote control transmitter of claim 7 wherein there are a plural number of decoding bits, said decoding bits including a synchronization bit occurring prior to each of said information bits, and said decoding pulse generating means including a synchronization pulse logic gate with a plurality of inputs respectively coupled to one of said outputs of each of said flip-flop stages, said synchronization gate generating a synchronization pulse in response to all of said synchronization gate inputs being in the same state, all of said synchronization gate inputs being in the same state only during each of said synchronization bits.

9. The remote control transmitter of claim 8 wherein at least one bit, other than a synchronization bit, occurs prior to each of said information bits.

10. The remote control transmitter of claim 8 wherein said decoding bits include an execute bit occurring after the last of said information bits, and said decoding pulse generating means includes an execute pulse logic gate with a plurality of said flip-flop stages, said execute gate generating an execute pulse in response to all of said execute gate inputs being in the same state, all of said execute gate inputs being in the same state only when said flip-flop stages are in a collective state corresponding to said execute bit.

11. The remote control transmitter of claim 10 wherein said clock pulse coupling mans comprises a clock pulse logic gate with an output coupled to said toggle input, a first input coupled to said clock pulse generating means and a second input coupled to the output of said execute gate, said clock pulse logic gate being disabled by said execute pulse from generating any subsequent clock pulses, and said flip-flop stages maintaining said collective state until a subsequent clock pulse is applied to said toggle input.

12. The remote control transmitter of claim 7 wherein said combining means comprises a logic gate with at least one input for receiving decoding pulses, another input coupled to the output of said command pulse gate for receiving said command pulses, and an output coupled to said transmitting means, said combining logic gate generating said composite signal of pulses in response to pulses at either of said combining logic gate inputs for driving said transmitting means.

13. The remote control transmitter of claim 12 wherein said transmitting means comprises an oscillator for driving a transducer to transmit pulses of supersonic or ultrasonic sound waves corresponding to said composite signal pulses, said oscillator being switched on and off in response to said composite signal.

14. A remote control system for selectively controlling a plurality of remote devices comprising:

remote control transmitter means for generating a composite signal sequence of single-frequency pulses in response to actuation of any one of a plurality of selection switches, said composite signal containing decoding pulses and a command signal comprising a binary-coded combination of information bits unique to the particular switch actuated, each combination representing a different control for said devices; and remote control receiver means for receiving said composite signal and decoding said code combination to control said devices in response thereto, including means for generating a composite signal of voltage pulses corresponding to said received composite signal, storage means for temporarily storing generated information bits of said generated composite signal, means responsive to generated decoding pulses of said generated composite signal to prevent storage except when said generated information bits are presented for storage, and means responsive to the code combination of information bits in said storage means for controlling said devices in accordance with the control represented thereby.

15. The remote control system of claim 14 wherein the entire generated composite signal is presented to an information input of said storage means, said storage means storing said signal at said information input only when a clock pulse transition occurs at a clock pulse input of said storage means, said storage prevention means including means for generating said clock pulse transition only when said generated information bits are presented, thereby preventing storage of said generated decoding pulses and enabling storage of said information bits.

16. The remote control system of claim 15 wherein said clock pulse generating means comprises logic gate means changing states in response to said generated composite signal except when said logic gate is disabled, first monostable means changing states in response to said generated decoding pulses for disabling said logic gate during said generated information bits, said logic gate thereby generating pulses only in response to said generated decoding pulses, and second monostable means generating clock pulse transitions driving each of said generated information bits in response to said logic gate pulses.

17. The remote control system of claim 16 wherein a decoding pulse is generated prior to each of said generated information bits.

18. The remote control of claim 15 wherein said code combination responsive means comprises, decoding means coupled to said storage means, said decoding means actuating one of a plurality of outputs during storage of a code combination of information bits unique to said one actuated output, and a control means coupled to each of said decoding outputs with only the control means coupled to said actuated decoding output controlling an associated remote device in response to a read pulse coupled to all of said control means, said read pulse generated in response to one of said generated decoding pulses.

19. The remote control system of claim 18 wherein said read pulse generator is actively coupled to said generated composite signal and generates said read pulse only in response to an elongated decoding pulse.

20. The remote control system of claim 19 wherein said elongated decoding pulse is generated after the last of said generated information bits is stored.

21. The remote control system of claim 14 wherein said remote control transmitter includes timing means successively assuming an ordered sequence of distinguishable states, each state corresponding to a different bit, means responsive to said timing means for generating a decoding pulse during preselected ones of said bits, means responsive to said timing means for generating a command pulse during selected ones of said information bits, means for combining said generated decoding pulses with said generated command pulses into a composite digital signal, and means for transmitting a pulse train of single-frequency pulses corresponding to said composite signal.

22. The remote control system of claim 21 wherein said remote control transmitter includes means for generating a decoding pulse prior to each of said information bits.

23. The remote control system of claim 21 wherein said remote control transmitter includes means responsive to said timing means for generating an elongated decoding pulse after the last of said information bits.

24. The remote control system of claim 21 wherein said remote control transmitter includes means responsive to said timing means for stopping said timing means from successively assuming said distinguishable states, said timing means being stopped in a state corresponding to one of said preselected ones of said bits such that said decoding pulse generating means generates an elongated decoding pulse after the last of said information bits.

* * * * *

PO-1050
(5/69)

UNITED STATES PATENT OFFICE
CERTIFICATE OF CORRECTION

Patent No. 3,631,398 Dated December 28, 1971

Inventor(s) LARRY R. HOUGHTON

It is certified that error appears in the above-identified patent and that said Letters Patent are hereby corrected as shown below:

Claim 1 - Column 7, line 16, correct spelling of "for";
line 20, correct spelling of "for";

Claim 2 - Column 7, line 35, correct spelling of "there";

Claim 5 - Column 7, line 58, correct spelling of "changing";

Claim 10 - Column 8, line 36, after "of" insert omitted wording as follows: --inputs respectively coupled to one of said outputs of each of --;

Claim 11 - Column 8, line 43, correct spelling of "means".

Signed and sealed this 17th day of October 1972.

(SEAL)
Attest:

EDWARD M.FLETCHER,JR.
Attesting Officer

ROBERT GOTTSCHALK
Commissioner of Patents